(12) United States Patent
Lee et al.

(10) Patent No.: US 11,933,599 B2
(45) Date of Patent: Mar. 19, 2024

(54) ELECTRONIC DEVICE AND METHOD FOR CONTROLLING SAME

(71) Applicant: Samsung Electronics Co., Ltd., Suwon-si (KR)

(72) Inventors: Taehee Lee, Suwon-si (KR); Hwayong Kang, Suwon-si (KR); Dongsoo Kim, Suwon-si (KR); Minjae Kim, Suwon-si (KR); Sahnggyu Park, Suwon-si (KR); Dongwon Yeo, Suwon-si (KR); Haesun Lee, Suwon-si (KR); Seungryong Jeon, Suwon-si (KR); Yongju Jeong, Suwon-si (KR); Donghoon Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/289,977

(22) PCT Filed: Sep. 9, 2019

(86) PCT No.: PCT/KR2019/011626
§ 371 (c)(1),
(2) Date: Apr. 29, 2021

(87) PCT Pub. No.: WO2020/096192
PCT Pub. Date: May 14, 2020

(65) Prior Publication Data
US 2022/0006939 A1    Jan. 6, 2022

(30) Foreign Application Priority Data

Nov. 8, 2018  (KR) .................. 10-2018-0136333

(51) Int. Cl.
*G01B 11/26*    (2006.01)
*B60W 40/02*    (2006.01)
(Continued)

(52) U.S. Cl.
CPC .......... *G01B 11/026* (2013.01); *B60W 40/02* (2013.01); *G06T 7/55* (2017.01); *G06T 7/70* (2017.01);
(Continued)

(58) Field of Classification Search
CPC .... G06F 3/017; H04N 5/2353; H04N 5/2253; H04N 5/2258; G06T 2207/20021;
(Continued)

(56) References Cited

U.S. PATENT DOCUMENTS 7,495,699 B2    2/2009  Nayar et al.
7,983,500 B2    7/2011  Zeng et al.
(Continued)

FOREIGN PATENT DOCUMENTS

CN    102457669 A    5/2012
CN    103312973 A    9/2013
(Continued)

OTHER PUBLICATIONS

European Search Report dated Sep. 21, 2021, issued in European Application No. 19882935.0.
(Continued)

*Primary Examiner* — Masum Billah
(74) *Attorney, Agent, or Firm* — Jefferson IP Law, LLP

(57) ABSTRACT

Disclosed is an electronic device. The electronic device comprises: a first image sensor and a second image sensor; and a processor which alternately performs a first image capture mode, in which a plurality of captured images are acquired by controlling the respective exposure times of the first image sensor and the second image sensor differently, and a second imager capture mode, in which a plurality of captured images are acquired by controlling the respective exposure times of the first image sensor and the second image sensor identically, identifies an object by using the (Continued)

plurality of captured images acquired in the first image capture mode, and acquires distance information about the identified object on the basis of the plurality of captured images acquired in the second image capture mode.

10 Claims, 7 Drawing Sheets

(51) Int. Cl.
| | |
|---|---|
| *G01B 11/02* | (2006.01) |
| *G06T 7/55* | (2017.01) |
| *G06T 7/70* | (2017.01) |
| *G06V 10/25* | (2022.01) |
| *G06V 20/56* | (2022.01) |
| *H04N 23/73* | (2023.01) |
| *H04N 23/741* | (2023.01) |
| *H04N 23/90* | (2023.01) |

(52) U.S. Cl.
CPC ............. *G06V 10/25* (2022.01); *G06V 20/56* (2022.01); *H04N 23/73* (2023.01); *H04N 23/741* (2023.01); *H04N 23/90* (2023.01); *B60W 2420/42* (2013.01); *G06T 2207/30252* (2013.01)

(58) Field of Classification Search
CPC . G06T 2207/20032; G06T 2207/30132; G06T 2207/30242; G06T 2207/30256; G06T 5/008; G06T 5/20; G06T 7/0004; G06T 7/70
USPC ........................................................ 348/148
See application file for complete search history.

(56) References Cited

U.S. PATENT DOCUMENTS

| | | | |
|---|---|---|---|
| 8,072,503 B2 | 12/2011 | Tischer | |
| 8,493,436 B2 | 7/2013 | Lyon et al. | |
| 8,817,160 B2 | 8/2014 | Lee et al. | |
| 9,137,451 B2 | 9/2015 | Yang et al. | |
| 9,148,561 B2 | 9/2015 | Kubota | |
| 9,392,184 B2 | 7/2016 | Yang et al. | |
| 9,426,378 B2 | 8/2016 | Yang et al. | |
| 9,571,743 B2 | 2/2017 | Huang et al. | |
| 9,615,012 B2 | 4/2017 | Geiss et al. | |
| 9,704,250 B1 | 7/2017 | Shah et al. | |
| 9,894,287 B2 | 2/2018 | Qian et al. | |
| 10,586,390 B2 | 3/2020 | Han et al. | |
| 10,627,228 B2 | 4/2020 | Takemura et al. | |
| 2002/0135703 A1 | 9/2002 | Schmitz et al. | |
| 2004/0090446 A1 | 5/2004 | Lee et al. | |
| 2010/0232661 A1* | 9/2010 | Hisanaga | G06K 9/00 382/128 |
| 2011/0176024 A1 | 7/2011 | Kwon et al. | |
| 2011/0211768 A1 | 9/2011 | Thoms | |
| 2012/0249844 A1 | 10/2012 | Saito et al. | |
| 2013/0163813 A1 | 6/2013 | Shoji | |
| 2013/0235232 A1 | 9/2013 | Yang et al. | |
| 2014/0325439 A1 | 10/2014 | Sohn et al. | |
| 2015/0296114 A1 | 10/2015 | Yang et al. | |
| 2015/0304537 A1 | 10/2015 | Yang et al. | |
| 2015/0341620 A1* | 11/2015 | Han | H04N 13/271 701/99 |
| 2015/0350510 A1 | 12/2015 | Han | |
| 2016/0180541 A1 | 6/2016 | Romanenko | |
| 2017/0026594 A1 | 1/2017 | Shida et al. | |
| 2017/0054911 A1 | 2/2017 | Lee et al. | |
| 2017/0171449 A1 | 6/2017 | Kino | |
| 2018/0033206 A1 | 2/2018 | Han et al. | |
| 2018/0038689 A1 | 2/2018 | Takemura et al. | |
| 2018/0054559 A1 | 2/2018 | Welker | |
| 2018/0084180 A1 | 3/2018 | Kim et al. | |
| 2018/0124297 A1* | 5/2018 | Matsuhashi | H04N 5/23245 |
| 2018/0131913 A1 | 5/2018 | Nakagoshi | |
| 2018/0165809 A1 | 6/2018 | Stanitsas et al. | |
| 2018/0246521 A1 | 8/2018 | Seo et al. | |
| 2018/0278824 A1 | 9/2018 | Somasundaram et al. | |
| 2019/0222769 A1* | 7/2019 | Srivastava | G06F 3/048 |
| 2020/0014864 A1 | 1/2020 | Kang | |
| 2020/0358966 A1 | 11/2020 | Lee et al. | |

FOREIGN PATENT DOCUMENTS

| | | | |
|---|---|---|---|
| CN | 107045715 A | 8/2017 | |
| CN | 107665485 A | 2/2018 | |
| CN | 107925729 A | 4/2018 | |
| CN | 108259774 A | 7/2018 | |
| JP | 2007-214813 A | 8/2007 | |
| JP | 2009-017474 A | 1/2009 | |
| JP | 2011-254340 A | 12/2011 | |
| JP | 2013-066247 A | 4/2013 | |
| JP | 2015-207861 A | 11/2015 | |
| JP | 2016-148962 A | 8/2016 | |
| JP | 2016-184154 A | 10/2016 | |
| JP | 6259185 B2 | 1/2018 | |
| KR | 10-2001-0067778 A | 7/2001 | |
| KR | 10-2008-0018631 A | 2/2008 | |
| KR | 10-2010-0053287 A | 5/2010 | |
| KR | 10-2013-0021496 A | 3/2013 | |
| KR | 10-1714641 B1 | 3/2017 | |
| KR | 10-2018-0023644 A | 3/2018 | |
| KR | 10-1866676 B1 | 6/2018 | |
| KR | 10-2018-0102331 A | 9/2018 | |
| KR | 10-2019-0084463 A | 7/2019 | |
| WO | 2017/196670 A1 | 11/2017 | |

OTHER PUBLICATIONS

European Search Report dated Oct. 8, 2021, issued in European Application No. 19876463.1.
High Dynamic Range Video: From Acquisition, to Display and Applications, p. 311(2016).
Chinese Office Action dated Oct. 28, 2022, issued in Chinese Patent Application No. 201980071198.3.
Korean Office Action dated Nov. 7, 2022, issued in Korean Patent Application No. 10-2018-0127399.
European Office Action dated Jan. 19, 2023, issued in a European Patent Application No. 19 882 935.0.
European Office Action dated Feb. 15, 2023, issued in a European Patent Application No. 19 876 463.1.
Nazgul et al., Bit-plane extracted moving-object detection using memristive crossbar-cam arrays for edge computing image devices, 2018.
Lin et al., Image bit-planes representation for moving object detection in real-time video surveillance, 2016.
Wang et al., Application of image correction and bit-plane fusion in generalized PCA based face recognition, 2007.
U.S. Non-final Office Action dated Apr. 28, 2023, issued in U.S. Appl. No. 17/278,471.
Chinese Office Action dated May 11, 2023, issued in Chinese Patent Application No. 201980071198.3.
U.S. Final Office Action dated Aug. 4, 2023, issued in U.S. Appl. No. 17/278,471.
Chinese Office Action dated Aug. 15, 2023, issued in Chinese Application No. 201980071198.3.
U.S. Notice of Allowance dated Oct. 27, 2023, issued in U.S. Appl. No. 17/278,471.
Wei-Guo Li et al., Recognition of Insulator Based on Developed MPEG-7 Texture Feature, Oct. 2010.
Korean Office Action dated Dec. 15, 2023, issued in Korean Application No. 10-2018-0136333.
Chinese Office Action dated Jan. 16, 2024, issued in Chinese Application No. 201980057700.5.

* cited by examiner

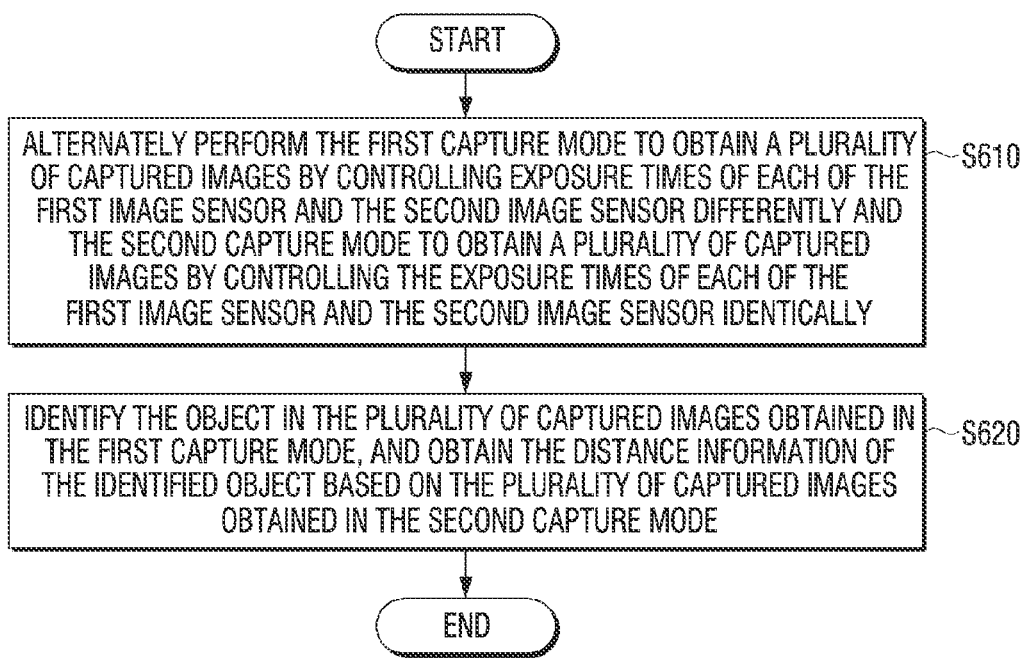

ELECTRONIC DEVICE AND METHOD FOR CONTROLLING SAME

TECHNICAL FIELD

This disclosure relates to an electronic device and a method for controlling thereof and, more specifically, to an electronic device for obtaining visibility and distance information by using a multi-camera and a method for controlling thereof.

BACKGROUND ART

A high dynamic range (HDR) technology which extends a range of brightness to be close to what a human sees in the real eyes by making a bright area in a digital image to be brighter and a dark area to be darker gains attention.

In order to identify an object based on the HDR technology and obtain distance information of the identified object, a minimum of three cameras may be required. For example, two cameras may be required to implement the HDR technology, and two cameras may be required to calculate distance information of an object using a stereo camera. Even if one of the cameras is used to implement the HDR technology and is used as a stereo camera, three cameras may be required as described above.

DISCLOSURE

Technical Problem

The disclosure has been made to solve the above-described problems, and an object of the disclosure is to provide an electronic device for identifying an object in an image obtained through the HDR technology using a multi-camera, and obtaining distance information of the identified object, and a method for controlling thereof.

Technical Solution

According to an embodiment, an electronic device may include a first image sensor, a second image sensor, and a processor.

The processor may alternately perform a first image capture mode, in which a plurality of captured images are obtained by controlling respective exposure times of the first image sensor and the second image sensor differently, and a second image capture mode, in which a plurality of captured images are obtained by controlling respective exposure times of the first image sensor and the second image sensor identically.

The processor may identify an object by using the plurality of captured images obtained in the first image capture mode and obtain distance information about the identified object based on the plurality of captured images obtained in the second image capture mode.

The processor may control an exposure time of the first image sensor to a first exposure time in the first capture mode and control an exposure time of the second image sensor to a second exposure time.

The processor may control the exposure times of the first and second image sensors to the first exposure time in the second capture mode.

The second exposure time may exceed the first exposure time.

The processor may update the first exposure time based on at least one of a pixel value and position information of the object included in at least one previous image obtained by the first image sensor.

The processor may update the second exposure time based on at least one of a pixel value and position information of the object included in at least one previous image obtained by the second image sensor in the first capture mode.

The processor may alternately perform the first capture mode and the second capture mode in a preset frame interval.

The processor may, based on a pixel value included in an image obtained by the second image sensor in the first capture mode being less than a preset value, control the exposure time of the second image sensor to exceed a time period corresponding to a frame.

The electronic device may be a driving assistant device mounted on a vehicle.

The processor may control the vehicle based on at least one of type information and distance information of the object.

The processor may generate a high dynamic range (HDR) image using a plurality of captured images obtained in the first capture mode and identify the object by using the HDR image.

According to an embodiment, a method for controlling an electronic device includes alternately performing a first image capture mode, in which a plurality of captured images are obtained by controlling respective exposure times of the first image sensor and the second image sensor differently, and a second image capture mode, in which a plurality of captured images are obtained by controlling respective exposure times of the first image sensor and the second image sensor identically and identifying an object by using the plurality of captured images obtained in the first image capture mode and obtaining distance information about the identified object based on the plurality of captured images obtained in the second image capture mode.

The alternately performing may include controlling an exposure time of the first image sensor to a first exposure time in the first capture mode and controlling an exposure time of the second image sensor to a second exposure time.

The alternately performing may include controlling the exposure times of the first and second image sensors to the first exposure time in the second capture mode.

The second exposure time may exceed the first exposure time.

The method may further include updating the first exposure time based on at least one of a pixel value and position information of the object included in at least one previous image obtained by the first image sensor and updating the second exposure time based on at least one of a pixel value and position information of the object included in at least one previous image obtained by the second image sensor in the first capture mode.

The alternately performing may include alternately performing the first capture mode and the second capture mode in a preset frame interval.

The alternately performing may include, based on a pixel value included in an image obtained by the second image sensor in the first capture mode being less than a preset value, controlling the exposure time of the second image sensor to exceed a time period corresponding to a frame.

The electronic device may be a driving assistant device mounted on a vehicle.

The method may further include controlling the vehicle based on at least one of type information and distance information of the object.

The obtaining the distance information may include generating a high dynamic range (HDR) image using a plurality of captured images obtained in the first capture mode and identifying the object by using the HDR image.

A non-transitory computer readable medium storing computer instructions executed by a processor of an electronic device to cause the electronic device to perform operations including alternately performing a first image capture mode, in which a plurality of captured images are obtained by controlling respective exposure times of the first image sensor and the second image sensor differently, and a second image capture mode, in which a plurality of captured images are obtained by controlling respective exposure times of the first image sensor and the second image sensor identically and identifying an object by using the plurality of captured images obtained in the first image capture mode and obtaining distance information about the identified object based on the plurality of captured images obtained in the second image capture mode.

Effect of Invention

According to various embodiments as described above, an electronic device may capture an image through a multi-camera having different exposure times to increase the accuracy of identifying an object.

The electronic device may capture the image through the parallax of the multi-camera to obtain accurate distance information of the identified object.

The electronic device may identify the object and obtain distance information of the object by using only two cameras.

DESCRIPTION OF DRAWINGS

FIG. 6 is a flowchart illustrating a method for controlling an electronic device according to an embodiment.

BEST MODE FOR CARRYING OUT THE INVENTION

Mode for Carrying Out the Invention

Figure 1:
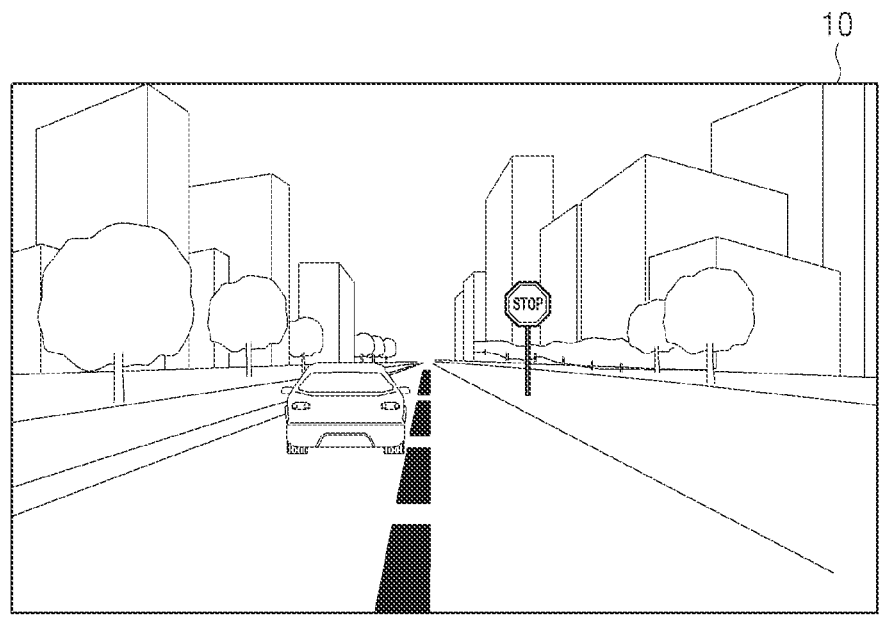
FIG. 1 is a diagram illustrating an electronic device to obtain as peripheral image including various objects to facilitate understanding of the disclosure.
Figure 1:
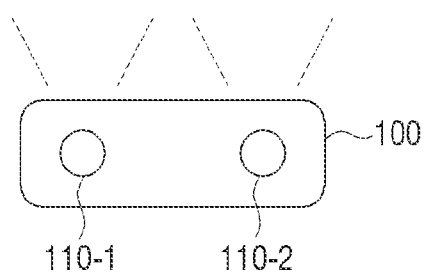

The disclosure will be described in greater detail below with reference to the accompanying drawings.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms such as "first," "second," and the like may be used to describe various components, but the components should not be limited by the terms. The terms are used to distinguish a component from another.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

Expressions such as "at least one of A and/or B" and "at least one of A and B" should be understood to represent "A," "B" or "A and B."

Terms such as "first," "second," and the like may be used to describe various components, but the components should not be limited by the terms. The terms are used to distinguish a component from another.

In addition, a description that one element (e.g., a first element) is "(operatively or communicatively) coupled with/to" or "connected to" another element (e.g., a second element) should be interpreted to include both the case that the one element is directly coupled to the other element, and the case that the one element is coupled to the another element through still another element (e.g., a third element). On the other hand, when a component (e.g., a first component) is referred to as being "directly connected" or "directly accessed" to another element (e.g., a second component), it may be understood that there is no intervening element (e.g., a third component) between any component and other components.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and may be realized in at least one processor (not shown).

In the following description, a term "user" may refer to a person using an electronic device, or a device (for example, an artificial intelligence electronic device) using an electronic device.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification and drawings.

Hereinafter, embodiments will be described in detail with reference to the accompanying drawings.

FIG. 1 is a diagram illustrating an electronic device to obtain as peripheral image including various objects to facilitate understanding of the disclosure.

Referring to FIG. 1, the electronic device 100 according to one embodiment may monitor a surrounding environment using a plurality of image sensors 110-1 and 110-2. The electronic device 100 is a driving assistant device mounted on a vehicle, and may be a device implementing advanced driver assistance systems (ADAS). The electronic device 100 may be implemented as an electrical system of a vehicle and may be implemented as a camera module installed inside a vehicle. Alternatively, the electronic device 100 may be implemented as a room mirror integrated module, or may be implemented with a portable device such as a black box, a mobile phone, and a personal digital assistant (PDA) detachable from the vehicle.

The electronic device 100 may obtain an image 10 which captures a surrounding environment, a front road situation, or the like, by using a plurality of image sensors 110-1, 110-2. The image sensor 110 is configured to capture a surrounding environment and may be referred to as a camera, a sensor, a capturing sensor, etc., and will be referred to as an image sensor for convenience.

According to an embodiment, the electronic device 100 may identify an object included in an image obtained through each of the plurality of image sensors 110-1 and 110-2, and obtain distance information of the identified object, and various embodiments will be described in detail with reference to the drawings.

Figure 2:
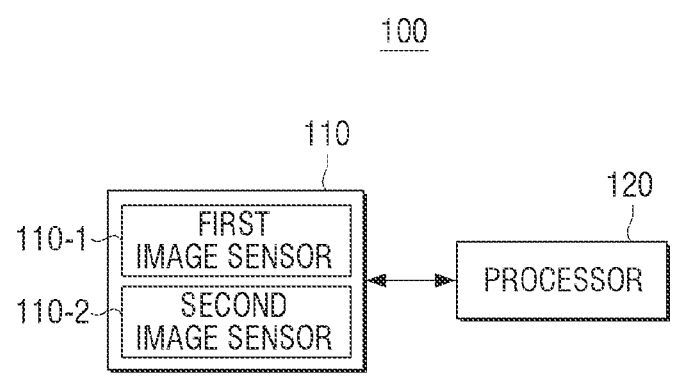
FIG. 2 is a block diagram illustrating a configuration of an electronic device according to an embodiment.

FIG. 2 is a block diagram illustrating a configuration of an electronic device according to an embodiment.

Referring to FIG. 2, the electronic device 100 includes an image sensor 110 including a first image sensor 110-1 and a second image sensor 110-2, and a processor 120.

The image sensor 110 is configured to obtain an image. The image sensor may convert light incident through a lens into an electric image signal to obtain a captured image. The image sensor 110 may be implemented as a charge coupled device (CCD) sensor or a complementary metal oxide semiconductor (CMOS) sensor, but is not limited thereto.

Images of different brightness may be obtained according to the exposure time of the image sensor 110. For example, when exposure time is short, a relatively dark image may be obtained and a relatively bright image may be obtained when exposure time is long. The exposure time may refer to the time when a shutter (not shown) connected to the image sensor 110 is opened to receive light.

For example, the exposure time of the image sensor 110 may be adjusted differently based on the surrounding environment. In one example, the exposure time may be adjusted relatively long to obtain a bright image when the surrounding environment is dark. In this example, the intensity of the light incident through the lens may be sensed, or the ambient illumination may be identified based on the pixel information of the captured image.

The image sensor 110 according to one embodiment may be mounted on a vehicle. For example, the first image sensor 110-1 and the second image sensor 110-2 may be spaced apart from each other to have different capturing times. For example, the image sensors may be arranged so as to capture a front at both ends of a room mirror. However, the first image sensor 110-1 and the second image sensor 110-2 may be spaced apart from each other at predetermined interval and arranged at various positions as well as the room mirror. For example, the first image sensor 110-1 and the second image sensor 110-2 may be arranged to capture the front at both ends of one of both side mirrors. As another example, the first image sensor 110-1 and the second image sensor 110-2 may be arranged to capture the front in each of the both side mirrors.

The processor 120 may control overall operations of the electronic device 100.

The processor 120 according to an embodiment may be implemented as, for example, a digital signal processor (DSP) for processing of a digital signal, a microprocessor, a time controller (TCON), or the like, but this is not limited thereto. The processor 120 may include, for example, and without limitation, one or more of a central processor (CPU), a micro controller unit (MCU), a micro-processor (MPU), a controller, an application processor (AP), a communication processor (CP), an advanced reduced instruction set computing (RISC) machine (ARM) processor, an artificial intelligence (AI) processor, or may be defined as a corresponding term. The processor 120 may be implemented in a system on chip (SoC) type or a large scale integration (LSI) type which a processing algorithm is built therein, or in a field programmable gate array (FPGA) type.

The processor 120 may alternately perform a first capture mode to obtain a plurality of captured image by controlling the exposure times of each of the first image sensor 110-1 and the second image sensor 110-2 differently and a second capture mode to obtain a plurality of captured images by controlling the exposure times of each of the first image sensor 110-1 and the second image sensor 110-2 equally. According to an embodiment, the processor 120 may alternately perform a first capture mode and a second capture mode at a predetermined frame interval. For example, the first capture mode and the second capture mode may be alternately performed at intervals of one frame or at least two frames.

The processor 120 may identify an object using a plurality of captured images obtained through the first image sensor 110-1 and the second image sensor 110-2 at the first capture mode.

Since the exposure times of the first image sensor 110-1 and the second image sensor 110-2 are controlled differently in the first capture mode, the brightness of the image obtained from each of the first image sensor 110-1 and the second image sensor 110-2 may be different. The discrimination of an object may be increased when identifying an object in a captured image with various brightness than identifying an object from an image captured with one brightness. In the first capture mode, the processor 120 may accurately identify the various objects in a plurality of captured images obtained from each of the first image sensor 110-1 and the second image sensor 110-2, of which exposure times are controlled differently. Alternatively, the processor 120 may synthesize the plurality of captured images obtained from each of the first image sensor 110-1 and the second image sensor 110-2 as one image and identify various objects in the composite image. The composite image may be an image in which a bright region is adjusted to be brighter, and a dark region is adjusted to be darker so that a contrast ratio may be high. The processor 120 may obtain an object from an image with an increased dynamic range.

The composite image in which the plurality of captured images obtained from the first image sensor 110-1 and the second image sensor 110-2 are composited to one image may be an HDR image. The processor 120 may generate the HDR image using the plurality of captured images obtained in the first capture mode, and identify the object by using the HDR image. The HDR image may be an image in which a bright region is displayed to be brighter, and a dark region is displayed to be darker so that a range of brightness on an image is extended.

The object may be an object of interest (or a region of interest). In other words, the processor 120 may identify an object of interest from the obtained plurality of captured images. For example, an object of interest may be an object that needs to be cautioned when traveling, such as a crosswalk, traffic lights, a traffic sign, a person, a vehicle, or the like, but this is only one example. A storage (not shown) may store information about an object of interest, and the processor 120 may obtain this information from the storage to identify the object in the captured image. For example, an object may be identified by searching a pixel value similar to the pixel value of an image of the object of interest stored in the storage by applying a search window to the captured image.

Alternatively, the electronic device 100 may include a separate training model in which the object information is trained, and the processor 120 may apply the captured image to the training model to identify the object. In this example, the training model may be implemented as a cognitive system, such as an artificial neural network or a neuromorphic processor. For example, the same training model may be applied to the first image captured by the first image sensor 110-1 and the second image captured by the second image sensor 110-2, but different training models may be applied to the first and second images. For example, the pixel values of the first and second images may be different and the pixel values of each object included may be different. Accordingly, a first training model trained with samples having a pixel value similar to the image captured by the first image sensor 110-1 may be applied to the first image, and a second training model trained with samples having a pixel value similar to the image captured by the second image sensor 110-2 may be applied to the second image to identify the object.

The processor 120 may aggregate the object information identified in the first image and the object information identified in the second image to finally identify the object. For example, if the first object and the second object are identified in the first image and the second object and the third object are identified in the second image, the first through third objects may be finally identified objects.

The processor 120 may obtain distance information of the identified object based on the plurality of captured images obtained from the second capture mode.

Since the first image sensor 110-1 and the second image sensor 110-2 are spaced apart from each other, there is a parallax between the image obtained through the first image sensor 110-1 and the image obtained through the second image sensor 110-2. The processor 120 may obtain distance information of an object included in a plurality of images using this parallax. The object is an object identified in the first capture mode. A technology for calculating distance information of an object by using a parallax between a plurality of image sensors corresponds to a stereo disparity technology, which is a well-known art, and thus a detailed description thereof will be omitted.

The second capture mode does not need to control the exposure time of the first image sensor 110-1 and the second image sensor 110-2 differently since the second capture mode is a mode for obtaining distance information of the object identified in the first capture mode through the stereo disparity technology.

The processor 120 may control the exposure time of the first image sensor 110-1 to a first exposure time in the first capture mode, and control the exposure time of the second image sensor 110-2 to a second exposure time. The processor 120 may control the exposure time of the first image sensor 110-1 and the second image sensor 110-2 to a first exposure time in a second capture mode.

The first exposure time is a time calculated based on the image information obtained from the first image sensor 110-1, and the second exposure time may be a time calculated based on the image information obtained from the second image sensor 110-2. The image information may include a pixel value of the captured image, a location information of an object included in the captured image, a gamma value, international standards organization (ISO) gain, or the like. The first exposure time and the second exposure time may be updated every mode to be performed alternately and will be described later.

The processor 120 may control the exposure time of the second image sensor 110-2 in the second capture mode to be the same as the exposure time of the first image sensor 110-1. Specifically, in the second capture mode, the processor 120 may apply the first exposure time calculated based on the image information obtained from the first image sensor 110-1 to the second image sensor 110-2.

Accordingly, the processor 120 may not obtain an exposure time based on image information obtained from the second image sensor 110-2 in a second capture mode, and thus, there may be an effect of reducing the computational amount of the processor 120.

The second exposure time may exceed the first exposure time. Specifically, since the second image sensor 110-2 in the first capture mode is set to have a longer exposure time than the first image sensor 110-1, the processor 120 may obtain a bright image from the second image sensor 110-2 than the image obtained from the first image sensor 110-1. For example, since the target pixel value of the second image sensor 110-2 is set to be higher than the target pixel value of the first image sensor 110-1, the second image sensor 110-2 may obtain a brighter image than the first image sensor 110-1 in the same illuminance environment of the first capture mode. The target pixel value may be a pixel value targeted by the pixel value included in the captured image obtained from each image sensor. The processor 120 may update the exposure time of each image sensor to reach the target pixel value, and this will be described later.

Even when the first image sensor 110-1 and the second image sensor 110-2 obtain the captured image in the same illumination environment, the second image sensor 110-2 may obtain a relatively bright image.

The processor 120 may update the first exposure time and the second exposure time based on the previous image information of the captured image obtained by the first image sensor 110-1 and the second image sensor 110-2.

The processor 120 may update the first exposure time based on at least one of a pixel value included in at least one previous image obtained by the first image sensor and location information of the object.

For example, the processor 120 may calculate an average value of a pixel value included in at least one previous image obtained by the first image sensor 110-1 (hereinafter, an average pixel value) and may control the exposure time so that the calculated average pixel value reaches a target pixel value. The average pixel value may be calculated using a mean value algorithm Since the mean value algorithm is a well-known art, detailed description thereof is omitted. The target pixel value may be pre-stored in a device or changed according to an illuminance environment.

In one example, when the average pixel value of at least one image obtained by the first image sensor approaches the target pixel value, the exposure time of the first image sensor 110-1 may be 15 ms. If the average pixel value of the at least one image obtained by the first image sensor 110-1 is greatly different from the target pixel value than the above-described example, the processor 120 may update the exposure time of the first image sensor to 33 ms. The processor 120 may update the first exposure time by comparing the average pixel value of the at least one image obtained by the first image sensor 110-1 and the target pixel value of the first image sensor 110-1.

The exposure time information corresponding to the average pixel value of at least one image obtained by the first image sensor 110-1 may be stored in a storage (not shown), and the processor 120 may obtain exposure time information from the storage based on the calculated average pixel value to update the first exposure time.

The processor 120 may update the exposure time based on the location information of the object included in the image. If the average pixel value of the image is used, a specific object may not be identified. For example, a case where the target pixel value of the first image sensor 110-1 is 127 and a situation that the first image sensor 110-1 captures the surrounding environment is a backlight situation. In the backlight situation, an image in which a specific object is dark and the surroundings of the specific object is bright may be obtained. In this example, the average pixel value of the obtained image may be calculated close to 127 so that the processor 120 may update the first exposure time to be short. The processor 120 may not accurately identify the type of the specific object included in the image obtained according to the updated exposure time. Accordingly, the processor 120 may update the exposure time considering the location information of the object included in the image.

The processor 120 may assign a weight to a pixel value of an area in which an object is arranged based on the location information of the object included in the image. For example, if an object included in an image is arranged in a central region of an image, the processor 120 may assign a weight to the pixel value of the central region. Accordingly, the processor 120 may update the exposure time of the first image sensor 110-1 to clearly identify the object located in the central region.

The processor 120 may update the second exposure time based on at least one of a pixel value included in at least one previous image obtained by the second image sensor 110-2 in the first capture mode and location information of the object.

The second exposure time applied to the second image sensor 110-2 may be updated in the same manner to the first exposure time. However, it may be different in that the processor 120 updaters the second exposure time based on the image information of the image captured by the second image sensor 110-2 in the first capture mode. The processor 120 may update the first exposure time based on at least one of the pixel values and the object location information of the at least one previous image captured from the first image sensor 110-1 in the first and second capture modes, but may update the second exposure time based on the pixel values and the location information of the object in the images obtained in the first capture mode of the at least one previous image captured from the second image sensor 110-2. This is because the second image sensor 110-2 may obtain an image by alternately using the first exposure time calculated based on image information obtained from the first image sensor 110-1 according to the capture mode and the second exposure time calculated based on image information obtained from the second image sensor 110-2. The processor 120 my independently calculate and update the first exposure time and the second exposure time, as in the embodiments described above.

The processor 120 may perform the first capture mode and the second capture mode alternately at a preset frame interval. If the preset event does not occur, the processor 120 may alternately perform the first capture mode and the second capture mode at a frame interval. For example, based on 30 fps, the exposure time of the image sensor 110 per frame cannot exceed 33 ms. The processor 120 may update the exposure time within 33 ms based on at least one of the pixel values and the location information of the object included in at least one previous image obtained by the image sensor 110.

If a preset event occurs, the processor 120 may control the exposure time of the image sensor 110 to exceed a time period corresponding to one frame. Here, the preset event may be an event that a pixel value included in an image obtained by the second image sensor 110-2 in the first capture mode is less than a preset value. That is, when the average pixel value of the at least one previous image obtained by the second image sensor 110-2 is less than the preset value, the processor 120 may control the exposure time of the second image sensor 110-2 to exceed a time period corresponding to one frame.

For example, in an illumination environment where the surrounding environment is very dark, even if the second image sensor 110-2 obtains a captured image with a maximum exposure time per frame, the object included in the image may not be identified. In this example, the processor 120 may control the exposure time to reach the target pixel value by setting the exposure time to be long even if the maximum exposure time per frame is exceeded. While the first capture mode is performed during a plurality of frames, and the first image sensor 110-1 obtains a plurality of captured images, the second image sensor 110-2 may obtain a captured image. In this example, the fps of the second image sensor 110-21 may be lower than the fps of the first image sensor 110-1. The processor 120 may obtain an image with a high contrast ratio from the first image sensor 110-1 and the second image sensor 110-2.

The processor 120 may repeat the first capture mode and the second capture mode by turns to identify the object with only the two image sensors and may obtain the distance information of the identified object.

The processor 120 may control a vehicle on which the electronic device 100 is mounted based on at least one of the type information and the distance information of the object. For example, if an object included in the captured image is identified as a traffic sign which limits the highest speed, the processor 120 may control the speed of the vehicle so as not to exceed the highest speed, or if the object included in the captured image is traffic lights, the processor 120 may identify a signal of the traffic lights to control the vehicle. When the distance of the object is less than a predetermined distance based on the distance information of the object included in the captured image, braking of the vehicle may be performed.

The electronic device 100 is a device mounted on a vehicle, or may be a device used to identify the object regardless of the vehicle and calculate the distance information of the identified object.

FIG. 2 illustrates the electronic device 100 including the image sensor 110 and the processor 120, but the electronic device 100 may be implemented in a form excluding the image sensor 110. In this example, the electronic device is composed of a memory and/or a processor, and the captured image may be obtained through an interface connected to an external image sensor.

FIG. 3 is a block diagram illustrating an example of a detailed configuration of an electronic device according to an embodiment.

Figure 3A:
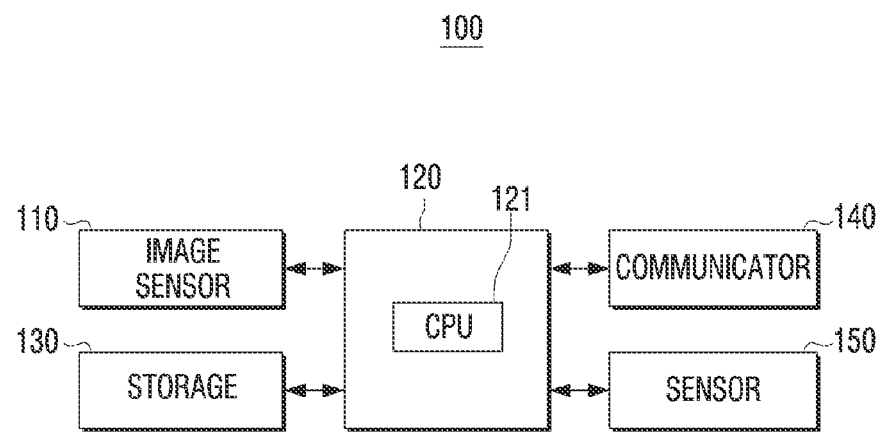
FIG. 3A is a block diagram illustrating an example of a detailed configuration of an electronic device according to an embodiment.

Referring to FIG. 3A, the electronic device 100 includes the image sensor 110, the processor 120, a communicator 140, a storage 130, and a sensor 150. In the configuration shown in FIG. 3A, detailed description of the structure as shown in FIG. 2 is omitted.

The processor 120 controls overall operations of the electronic device 100 using various programs stored in the storage 130 (e.g., memory).

To be specific, the processor 120 includes at least one of a random access memory (RAM), a read-only memory (ROM), a main central processing unit (CPU) 121, a first to $n^{th}$ interfaces, and a bus.

The RAM, the ROM, the main CPU 121, the first to $n^{th}$ interfaces, or the like, may be interconnected through the bus.

The ROM stores one or more instructions for booting the system and the like. When the turn-on instruction is input and power is supplied, the CPU 121 copies the OS stored in the storage 130 to the RAM according to the stored one or more instructions in the ROM, and executes the OS to boot the system. When the booting is completed, the CPU 121 copies various application programs stored in the storage 130 to the RAM, executes the application program copied to the RAM, and performs various operations.

The main CPU 121 accesses the storage 130 and performs booting using an operating system (OS) stored in the storage 130, and performs various operations using various programs, contents data, or the like, stored in the storage 130.

The first to $n^{th}$ interface are connected to the various elements described above. One of the interfaces may be a network interface connected to an external device through the network.

The communicator 140 may communicate with an external electronic device (not shown) or an external server (not shown). For example, the communicator 140 may perform communication with an external server according to wired/wireless communication method and may use a communication method such as Bluetooth™ (BT), wireless fidelity (WI-FI), Zigbee, infrared (IR), Ethernet, serial interface, universal serial bus (USB), near field communication (NFC), vehicle to everything (V2X), cellular, or the like.

The communicator 140 may receive the object information from an external server. The communicator 140 may transmit a control command to a vehicle controller (not shown) according to the control of the processor 120. For example, according to the control of the processor 120 based on at least one of the type information and the distance information of the object included in the captured image, the communicator 140 may transmit a command relative to the vehicle speed, a command relative to braking the vehicle, or the like, to the vehicle controller.

If an image sensor is not provided in the electronic device 100, the communicator 140 may receive a captured image obtained from an external image sensor.

The storage 130 may store various data, programs, or applications for driving/controlling the electronic device 100. The storage 130 may store the control program for controlling the electronic device 100 and the processor 120, applications that are initially provided by a manufacturer or downloaded from the outside, databases, or related data.

The storage 130 may store the plurality of captured images obtained from the first image sensor 110-1 and the second image sensor 110-2. A plurality of captured images stored in the storage 130 may be used in the process of updating the exposure time of the first image sensor 110-1 and the second image sensor 110-2.

The storage 130 may store the exposure time information corresponding to the average pixel value of the obtained image by the image sensor 110 as a format of a look-up table.

The storage 130 may store information about at least one of a region of interest and an object of interest. For example, the storage 130 may store type information of the traffic sign and the type information of the traffic lights, or the like. The type information stored in the storage 130 may be used for the processor 120 to identify the object included in the captured image. The electronic device 100 may include a separate training model in which the type information is trained, and may apply the captured image to the training model to identify the object. In this example, the training model may be implemented as a cognitive system, such as an artificial neural network or a neuromorphic processor.

The storage 130 may be implemented as an internal memory such as a ROM, a RAM, etc. included in the processor 120, or may be implemented with a memory separate from the processor 120. The storage 130 may be implemented as a non-volatile memory, a volatile memory, a hard disk drive (HDD), or a solid state drive (SSD).

The sensor 150 may detect input of various types. Specifically, the sensor 150 may be a touch sensor for detecting a user's touch, and the sensor 150 according to the disclosure may include various sensors such as an illuminance sensor, a motion sensor, or the like.

The electronic device 100 described above may be used independently but may be used to identify a specific object along with a RAadio Detection And Ranging (RADAR) unit, a LIght Detection And Ranging (LIDAR) unit, and calculate distance information of the identified object. The RADAR unit may be a sensor configured to detect objects in the environment in which the vehicle is located by using a wireless signal. The RADAR unit may be configured to detect the speed and/or direction of the objects. The LIDAR unit may be a sensor configured to detect objects in the environment in which the vehicle is located using a laser.

The electronic device 100 may additionally include a display (not shown).

The display may display the captured image obtained from the image sensor 110. The display may display various content including vehicle driving information, or the like. The vehicle driving information may include the current speed of the vehicle, the speed limit of the road on which the vehicle is currently driving, traffic sign information, or the like.

The display may be implemented with various forms such as a liquid crystal display (LCD), an organic light-emitting diode (OLED), liquid crystal on silicon (LCoS), digital light processing (DLP), quantum dot (QD) display panel, micro LED, or the like. The display may be implemented in a touch screen to form a layer structure with a touch pad. In this case, the display may be used as a user interface (not shown) in addition to the output device. The touch screen may be configured to detect the touch input pressure as well as the touch input position and area.

The electronic device 100 may not include a display separately, and may be connected to an external display device through an interface (not shown) to transmit a signal corresponding to various contents to an external display device.

Figure 3B:
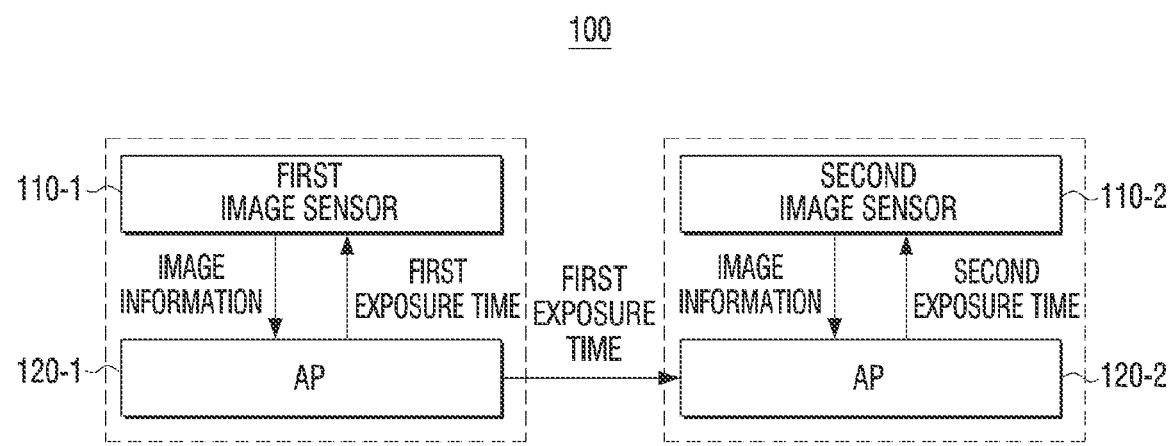
FIG. 3B is a diagram illustrating an example of an image sensor according to an embodiment.

FIG. 3B is a diagram illustrating an example of an image sensor according to an embodiment.

According to an embodiment, each of the first image sensor 110-1 and the second image sensor 110-2 may be connected to a separate processor, and the processor may be implemented as an application processor (AP).

An application processor connected to the first image sensor 110-1 may be referred to as a first application processor 120-1 and an application processor connected to the second image sensor 110-2 may be referred to as a second application processor 120-2. The application processors 120-1 and 120-2 may update the exposure time based on the image information of each of image sensors 110-1 and 110-2, and may apply the updated exposure time to each of first image sensor 110-1 and second image sensor 110-2 to obtain a captured image.

The first application processor 120-1 ay update the first exposure time based on image information of at least one previous image obtained by the first image sensor 110-1 and may transmit the updated first exposure time information to the second application processor 120-2 through an internal interface (not shown). Here, the internal interface may be implemented with a wired cable. The embodiment is not limited thereto and the internal interface may be implemented as a wireless communication module such as a Bluetooth™ (BT), a Wireless Fidelity (WI-FI), or the like. The second application processor 120-2 may control the exposure time of the second image sensor 110-2 in the first capture mode based on the received first exposure time information to obtain a captured image.

According to another embodiment, the first application processor 120-1 may transmit the first exposure time information to the second application processor 120-2 through an external interface.

Figure 4:
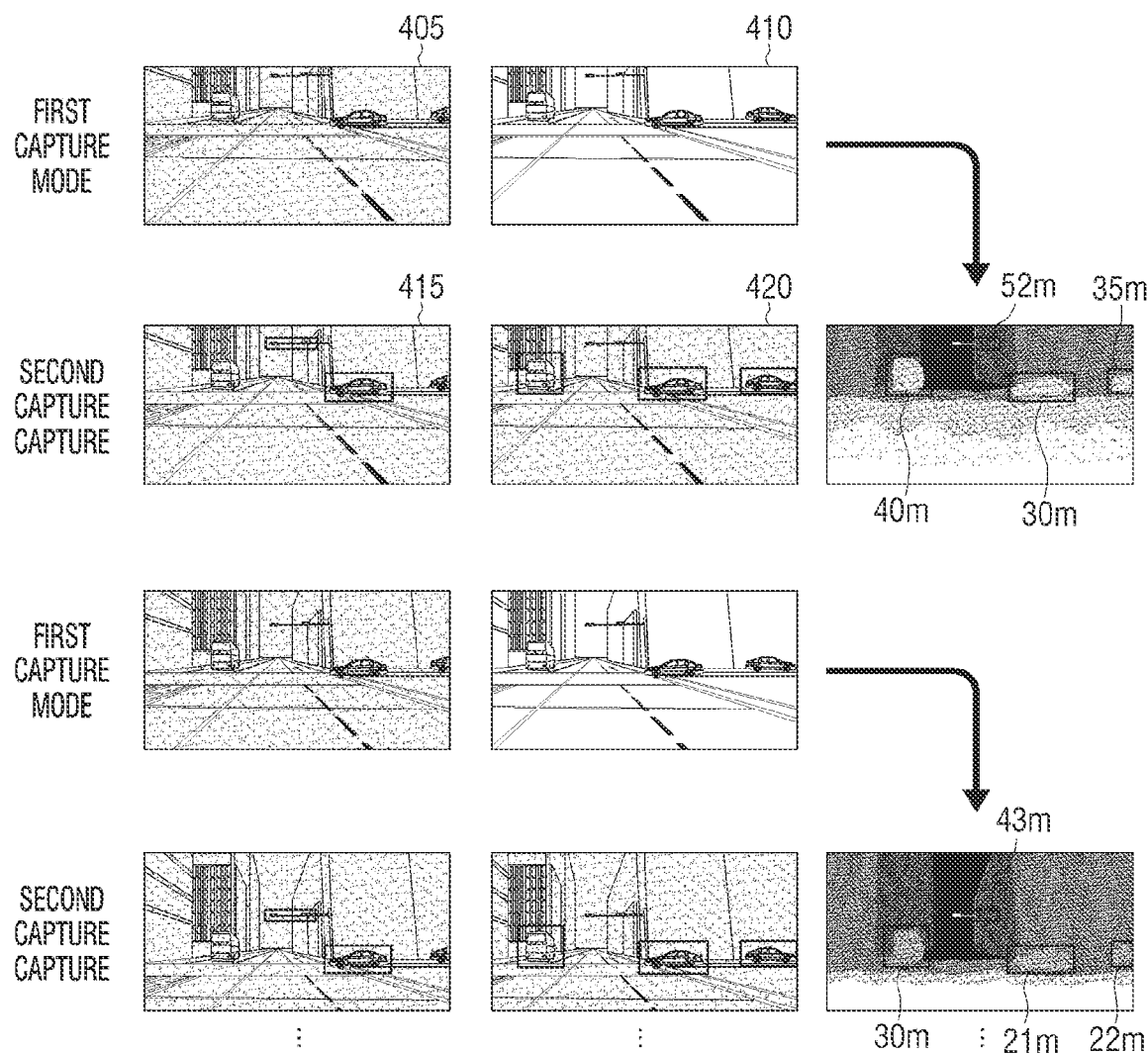
FIG. 4 is a diagram illustrating an operation of alternately performing a first capture mode and a second capture mode according to an embodiment.

FIG. 4 is a diagram illustrating an operation of alternately performing a first capture mode and a second capture mode according to an embodiment.

According to FIG. 4, the electronic device 100 may perform a first capture mode to obtain a plurality of captured images 405 and 410 by controlling the exposure time of each of the first image sensor 110-1 and the second image sensor 110-2 differently.

Since the exposure time of the first image sensor 110-1 and the second image sensor 110-2 in the first capture mode are controlled differently, as shown in FIG. 4, the brightness of the image 405 obtained from the first image sensor 110-1 and the image 410 obtained from the second image sensor 110-2 may be different. The electronic device 100 may control the exposure time of the first image sensor 110-1 to the first exposure time (e.g., 5 ms) in the first capture mode, and control the exposure time of the second image sensor 110-2 to a second exposure time (e.g., 30 ms). Since the second exposure time exceeds the first exposure time, the image 410 obtained from the second image sensor 110-2 may be an image brighter than the image 405 obtained from the first image sensor 110-1.

The electronic device 100 may identify an object in the plurality of captured images 405, 410 obtained in the first capture mode. The electronic device 100 may have higher discrimination in a case of identifying an object from an image captured with various brightness, rather than a case of identifying an image captured with single brightness.

The electronic device 100 may identify different objects from the image obtained from the first image sensor 110-1 and the image obtained from the second image sensor 110-2. As shown in FIG. 4, the electronic device 100 may identify a traffic light region in the image 405 obtained from the first image sensor 110-1, but may not identify the image in the image 410 obtained from the second image sensor 110-2. The electronic device may identify a plurality of vehicles in the image 410 obtained from the second image sensor 110-2, but may identify only one vehicle in the image 405 obtained from the first image sensor 110-1.

This is because the discrimination of an object may be increased when identifying an object in an image captured with various brightness than when identifying an object from an image captured with one brightness.

The electronic device 100 may perform a second capture mode to obtain a plurality of captured images 415, 420 by controlling the exposure time of each of the first image sensor 110-1 and the second image sensor 110-2 identically. The electronic device 100 may control the exposure time of the second image sensor 110-2 to be the same as the exposure time of the first image sensor 110-1. Therefore, as shown in FIG. 4, the image 415 obtained from the first image sensor 110-1 and the image 420 obtained from the second image sensor 110-2 may have the same brightness.

Accordingly, the electronic device 100 does not obtain the exposure time based on image information obtained from the second image sensor 110-2 in the second capture mode, and thus, there may be an effect of reducing the computational amount of the electronic device 100.

Since the first image sensor 110-1 and the second image sensor 110-2 are spaced apart from each other, there is a parallax between the image 415 obtained through the first image sensor 110-1 and the image 420 obtained through the second image sensor 110-2. The electronic device 100 may obtain the distance information of an object included in the plurality of captured images 405, 410 using the parallax. Here, the object may refer to all objects identified in a plurality of images 405, 410 of the first capture mode.

The electronic device 100 may alternately perform the first capture mode and the second capture mode by frames.

Figure 5:
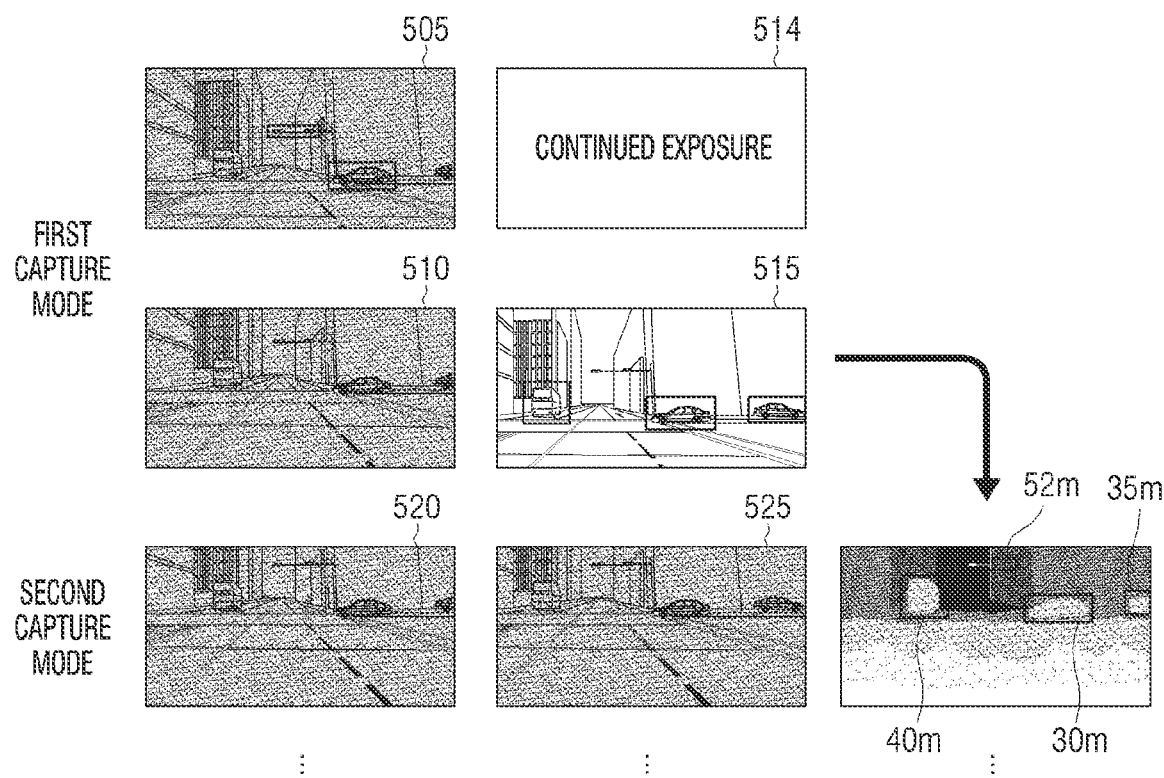
FIG. 5 is a diagram illustrating an operation that an exposure time of a second image sensor exceeds a time period corresponding to a frame according to an embodiment.

FIG. 5 is a diagram illustrating an operation that an exposure time of a second image sensor exceeds a time period corresponding to a frame according to an embodiment.

As illustrated in FIG. 4, the electronic device 100 may alternately perform the first capture mode and the second capture mode by one frame interval.

If the average pixel value of the at least one previous image obtained by the second image sensor 110-2 is less than the preset value, the electronic device 100 may control the exposure time of the second image sensor 110-2 to exceed a time period corresponding to one frame.

For example, in an illumination environment where the surrounding environment is very dark, even if the second image sensor 110-2 obtains a captured image with a maximum exposure time per frame, the object included in the image may not be identified. In this case, the electronic device 100 may obtain an image having a target pixel value by setting the exposure time to exceed the maximum exposure time per frame, as shown in FIG. 5. Accordingly, the second image sensor 110-2 may obtain a captured image 515 while the first capture mode is performed during a plurality of frames and the first image sensor 110-1 obtains a plurality of captured images 505, 510. In other words, the exposure of a shutter 514 connected to the second image sensor 110-2 may be continued while the first image sensor 110-1 obtains the captured image 505, and the second image sensor 110-2 may obtain one captured image 515 in a state where the exposure time is adjusted to be relatively long. In this case, the fps of the second image sensor 110-2 may be lower than the fps of the first image sensor 110-1.

The electronic device 100 may perform the second capture mode to obtain a plurality of captured images 520, 525 by controlling the exposure time of each of the first image sensor 110-1 and the second image sensor 110-2 identically, and may obtain distance information of the object included in the plurality of captured images 520, 525.

Referring to FIG. 5, the exposure time of the first image sensor 110-1 is described as a time period corresponding to two frames, but the exposure time may be a time period corresponding to three or more frames according to the illuminance situation.

FIG. 6 is a flowchart illustrating a method for controlling an electronic device according to an embodiment.

The electronic device may alternately perform the first capture mode to obtain a plurality of captured images by controlling exposure times of each of the first image sensor 110-1 and the second image sensor 110-2 differently and the second capture mode to obtain a plurality of captured images by controlling the exposure times of each of the first image sensor 110-1 and the second image sensor 110-2 identically in operation S610.

The electronic device may control the exposure time of the first image sensor 110-1 to the first exposure time in the first capture mode, and control the exposure time of the second image sensor 110-2 to the second exposure time.

The electronic device may control the exposure time of the first image sensor 110-1 and the second image sensor 110-2 to the first exposure time in the second capture mode. The electronic device may control the exposure time of the second image sensor 110-2 in the second capture mode to be the same as the exposure time of the first image sensor 110-1. Accordingly, the electronic device does not obtain the exposure time based on the image information obtained from the second image sensor 110-2 in the second capture mode and thus, there may be an effect of reducing the computational amount of the electronic device 100.

The second exposure time may exceed the first exposure time. Specifically, the second image sensor 110-2 is set to have a longer exposure time than the first image sensor 110-1 in the first capture mode so that the electronic device may obtain a brighter image than the image obtained from the first image sensor 110-1.

The electronic device may update the first exposure time based on at least one of a pixel value included in at least one previous image and location information of the object obtained by the first image sensor 110-1. For example, the electronic device 100 may calculate an average pixel value included in at least one previous image obtained by the first image sensor 110-1 and control the exposure time so that the calculated average pixel value reaches a target pixel value. Alternatively, exposure time information corresponding to an average pixel value of at least one image obtained by the first image sensor 110-1 may be stored, and the electronic device may obtain stored exposure time information based on the calculated average pixel value and update the first exposure time.

The electronic device may update the second exposure time based on at least one of a pixel value included in at least one previous image obtained by the second image sensor 110-2 in the first capture mode and location information of the object.

The second exposure time applied to the second image sensor 110-2 may be updated in the same manner to the first exposure time. However, the electronic device 100 may update the second exposure time based on the image information of the image captured by the second image sensor 110-2 in the first capture mode.

The electronic device may alternately perform a first capture mode and a second capture mode at a predetermined frame interval. Here, the preset frame interval may be one frame interval.

If the pixel value included in the image obtained by the second image sensor 110-2 in the first capture mode is less than a predetermined value, the exposure time of the second image sensor 110-2 may be controlled to exceed a time interval corresponding to one frame.

The electronic device may identify the object using the plurality of captured images obtained in the first capture mode, and obtain the distance information of the identified object based on the plurality of captured images obtained in the second capture mode in operation S620.

The electronic device 100 may have a high discrimination of an object when identifying an object from an image captured with various brightness than identifying an object from an image captured with one brightness. In the first capture mode, the electronic device 100 may accurately identify various objects in the plurality of captured images obtained from each of the first image sensor 110-1 and the second image sensor 110-2 of which exposure times are controlled differently from each other.

Since the first image sensor 110-1 and the second image sensor 110-2 are spaced apart from each other, there is an image difference between images obtained through the first image sensor 110-1 and the image obtained through the second image sensor 110-2. The electronic device 100 may obtain distance information of an object included in a plurality of images by using this parallax.

The operation of S620 may be performed simultaneously with S610 or after S610.

The electronic device described above may be a driving assistance device mounted on a vehicle. The electronic device may be a device implementing Advanced Driver Assistance Systems (ADAS). For example, the electronic device may be an electronic system of a vehicle, and may be implemented as a camera module installed inside a vehicle, a room mirror integrated module, or a black box detachable from the vehicle, or the like.

The electronic device may control the vehicle based on at least one of the type information and distance information of the object.

The electronic device includes the image sensor 110 and the processor 120, but according to an embodiment, the electronic device may be implemented in a form excluding the image sensor 110. In this example, the electronic device may be composed of a memory and/or a processor, and the captured image may be obtained through an interface connected to the external image sensor.

Detailed operations of each step will not be further described.

At least some of the methods according to various embodiments described above may be installed in an existing electronic device, and may be implemented in an application form which is a software that is directly used by a user on the OS.

The methods according to the various embodiments as described above may be implemented as software upgrade or hardware upgrade for an existing electronic device.

The various embodiments described above may be performed through an embedded server provided in an electronic device, or an external server of at least one electronic device and a display device.

Meanwhile, various embodiments may be implemented in software, including instructions stored on machine-readable storage media readable by a machine (e.g., a computer). An apparatus may call instructions from the storage medium, and execute the called instruction, including an electronic apparatus (for example, an electronic device A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

In addition, one or more embodiments described above may be implemented in a computer readable medium, such as a computer or similar device, using software, hardware, or combination thereof. In some cases, the one or more embodiments described herein may be implemented by the processor itself. According to a software implementation, embodiments such as the procedures and functions described herein may be implemented with separate software modules. Each of the software modules may perform one or more of the functions and operations described herein.

According to some embodiments, computer instructions for performing the processing operations of the apparatus may be stored in a non-transitory computer-readable medium. The computer instructions stored in the non-transitory computer-readable medium may cause a particular apparatus to perform the processing operations on the apparatus according to the one or more embodiments described above when executed by the processor of the particular apparatus. Non-transitory computer readable medium is a medium that semi-permanently stores data and is readable by the apparatus. Examples of non-transitory computer-readable media may include CD, DVD, hard disk, Blu-ray disk, USB, memory card, ROM, or the like.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™, APPSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to embodiments, the respective elements (e.g., module or program) mentioned above may include a single entity or a plurality of entities. According to embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic device comprising:
   a storage configured to store information on an object of interest, the information including a pixel value of the object of interest;
   a first image sensor and a second image sensor; and
   a processor configured to:
      alternately perform a first capture mode, in which a plurality of captured images are obtained by controlling an exposure time of the first image sensor to a first exposure time and controlling an exposure time of the second image sensor to a second exposure time, and a second capture mode, in which a plurality of captured images are obtained by controlling the exposure time of the first image sensor and the exposure time of the second image sensor to the first exposure time,
      generate a high dynamic range (HDR) image by compositing the plurality of captured images having different brightness, obtained in the first capture mode, identify an object corresponding to the object of interest on the HDR image based on an area having a pixel value similar to the pixel value of the object of interest a pixel value stored in the storage, and obtain distance information about the identified object based on a parallax between the plurality of captured images obtained in the second capture modes, wherein the processor is further configured to:

update the first exposure time so that an average pixel value of pixels included in at least one previous image obtained by the first image sensor corresponds to a first target value, and update the second exposure time so that an average pixel value of pixels included in at least one previous image obtained by the second image sensor in the first capture mode corresponds to a second target value, and wherein the second target value is higher than the first target value.

2. The electronic device of claim 1, wherein the second exposure time exceeds the first exposure time.

3. The electronic device of claim 1, wherein the processor is further configured to alternately perform the first capture mode and the second capture mode in a preset frame interval.

4. The electronic device of claim 3, wherein the processor is further configured to, based on the average pixel value of the pixels included in an image obtained by the second image sensor in the first capture mode being less than the second target value, control the second exposure time of the second image sensor to exceed the preset frame interval.

5. The electronic device of claim 1, wherein the electronic device is a driving assistant device mounted on a vehicle.

6. The electronic device of claim 5, wherein the processor is further configured to control the vehicle based on at least one of type information and distance information of the object.

7. A method for controlling an electronic device comprising information on an object of interest, the information including a pixel value of the object of interest, the method comprising:

alternately performing a first capture mode, in which a plurality of captured images are obtained by controlling an exposure time of a first image sensor to a first exposure time and controlling an exposure time of a second image sensor to a second exposure time, and a second capture mode, in which a plurality of captured images are obtained by controlling the exposure time of the first image sensor and the exposure time of the second image sensor to the first exposure time;

generating a high dynamic range (HDR) image by compositing the plurality of captured images having different brightness, obtained in the first capture mode;

identifying an object corresponding to the object of interest on the HDR image based on an area having a pixel value similar to the pixel value of the object of interest a pixel value; and obtaining distance information about the identified object based on a parallax between the plurality of captured images obtained in the second capture mode, wherein the method further comprises:

updating the first exposure time so that an average pixel value of pixels included in at least one previous image obtained by the first image sensor corresponds to a first target value, and updating the second exposure time so that an average pixel value of pixels included in at least one previous image obtained by the second image sensor in the first capture mode corresponds to a second target value, and wherein the second target value is higher than the first target value.

8. The method of claimer 7, wherein the second exposure time exceeds the first exposure time.

9. The method of claim 7, wherein the alternately performing comprises alternately performing the first capture mode and the second capture mode in a preset frame interval.

10. The method of claim 9, wherein the alternately performing comprises, based on the average pixel value of the pixels included in an image obtained by the second image sensor in the first capture mode being less than the second target value, controlling the exposure time of the second image sensor to exceed the preset frame interval.

* * * * *